US006485116B1

(12) United States Patent
Oertley

(10) Patent No.: US 6,485,116 B1
(45) Date of Patent: Nov. 26, 2002

(54) JOINT ASSEMBLY TO RESIST GALLING

(75) Inventor: Thomas E. Oertley, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/642,676

(22) Filed: Aug. 21, 2000

(51) Int. Cl.[7] .............................................. B62D 55/12
(52) U.S. Cl. ...................................... 305/200; 305/202
(58) Field of Search ................................ 305/105, 102, 305/200, 202, 204, 42

(56) References Cited

U.S. PATENT DOCUMENTS

| | | | | |
|---|---|---|---|---|
| 2,301,954 A | * | 11/1942 | Knox | 305/203 |
| 2,314,355 A | * | 3/1943 | Knox | 305/42 |
| 2,396,848 A | * | 3/1946 | Haushalter | 305/42 |
| 2,517,429 A | * | 8/1950 | Henning | 305/202 |
| 2,598,828 A | | 6/1952 | Phelps | |
| 4,141,125 A | * | 2/1979 | Blunier | 305/105 |
| 4,149,758 A | | 4/1979 | Livesay | |
| 4,199,199 A | | 4/1980 | Granda | |
| 4,222,616 A | | 9/1980 | Brewer | |
| 4,290,236 A | | 9/1981 | Brewer et al. | |
| 4,438,981 A | * | 3/1984 | Harms | 305/202 |
| 4,618,190 A | | 10/1986 | Garman et al. | |
| 5,069,509 A | | 12/1991 | Johnson et al. | |
| 5,183,318 A | | 2/1993 | Taft et al. | |
| 5,201,171 A | | 4/1993 | Anderson et al. | |
| 5,249,868 A | | 10/1993 | Watts | |
| 5,257,858 A | | 11/1993 | Taft | |
| 5,511,869 A | * | 4/1996 | Edwards et al. | 305/202 |
| 5,887,958 A | | 3/1999 | Bissl et al. | |
| 6,045,200 A | | 4/2000 | Anderton et al. | |

FOREIGN PATENT DOCUMENTS

| | | |
|---|---|---|
| DE | 1480853 | 4/1969 |
| GB | 2228298 | 8/1990 |

* cited by examiner

Primary Examiner—S. Joseph Morano
Assistant Examiner—Long Bao Nguyen
(74) Attorney, Agent, or Firm—Bradford G. Addison; Diana L. Charlton

(57) ABSTRACT

Joint assemblies are useful for connecting one structure to another structure. When the various components deflect or bend edge loading occurs between the various components. The subject joint assembly includes a bushing positioned in one structure and a pin positioned in a second structure. An insert has an inner diameter positioned around the pin and an outer surface diameter positioned to interact with the bushing. The outer surface being a crowned surface. The joint assembly having the crowned insert directs forces to the center of the insert to reduce edge loading and deflection of the pin will be followed by the insert.

20 Claims, 1 Drawing Sheet

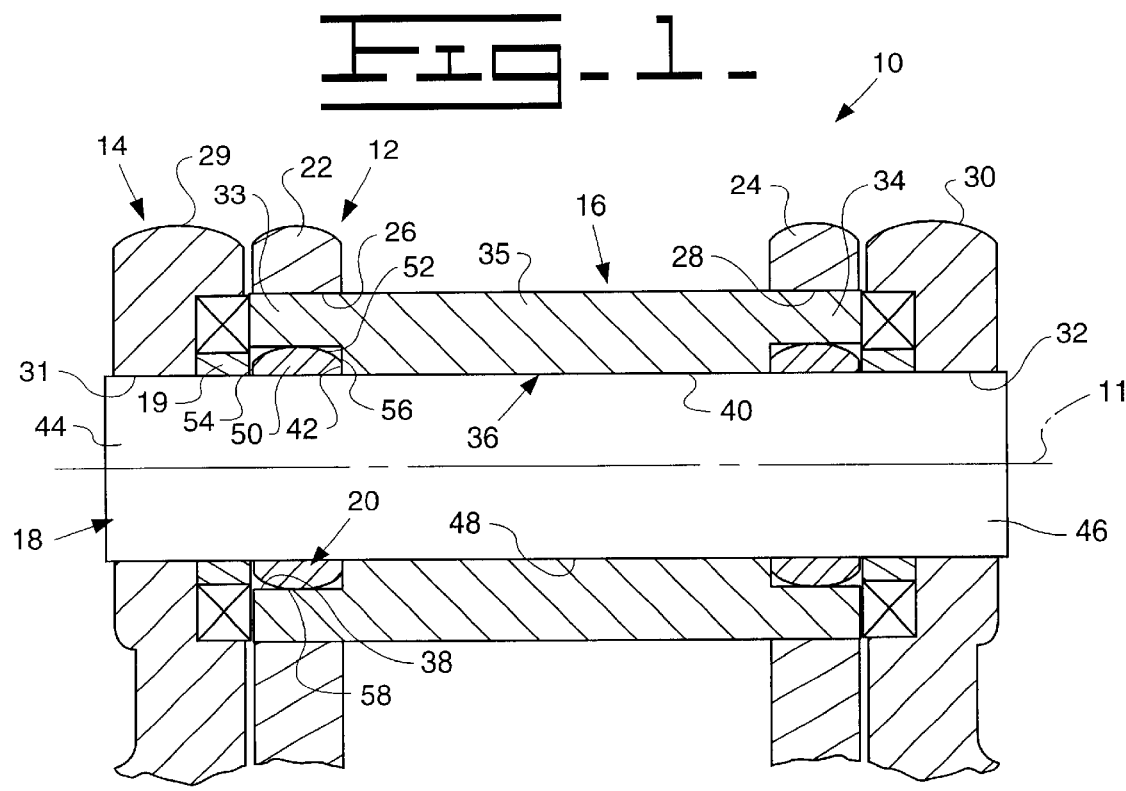
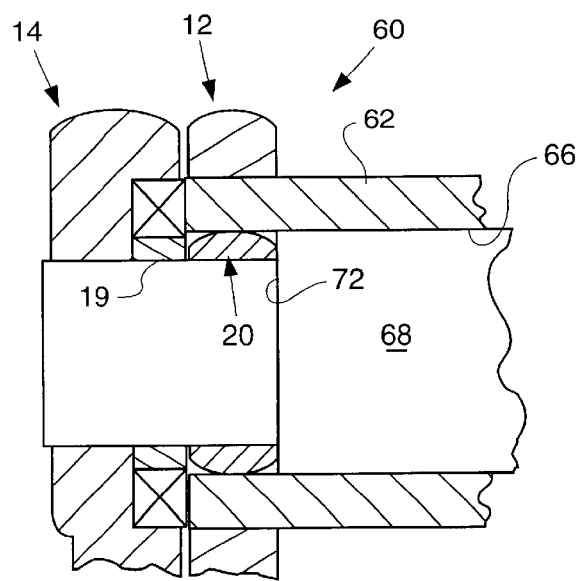

JOINT ASSEMBLY TO RESIST GALLING

TECHNICAL FIELD

This invention relates to a joint assembly for connecting a rotating structure together, and more particularly to an arrangement having a sleeve positioned between rotating members to resist galling.

BACKGROUND ART

Joint assemblies such as a track joint are customarily held together by an interference fit between the ends of the pin and their respective bores of the track link or structure. During use the joint assembly between the track links will receive unequal loading and have a tendency to deflect and bend. The deflection and bending of the track pin relative to the track bushing could result in edge loading on the various components. The edge loading could put stress into the various components so that when the components move relative to each other the components will wear or have a tendency to make grooves or gall the various components.

The present invention is directed to overcoming one or more of the problems as set forth above.

DISCLOSURE OF THE INVENTION

In one aspect of the present invention a joint assembly is adapted to connect a first structure to a second structure. The joint assembly includes a sleeve positioned in the first structure. The sleeve includes a first end portion, a second end portion and an intermediate portion. A bore extends therethrough. An insert is positioned within the bore of the sleeve. The insert has a inner diameter and an outer diameter. A pin is positioned in the second structure and being disposed within the intermediate portion of the sleeve and the insert.

The present invention provides a joint assembly having an insert positioned between a sleeve and a pin to reduce edge loading of the pin and sleeve to reduce wear and galling of the rotating components.

BRIEF DESCRIPTION OF THE DRAWINGS

FIG. 1 is a diagrammatic sectional view of a structure using the present invention; and FIG. 2 is a diagrammatic sectional view of an alternate structure of the present invention.

BEST MODE FOR CARRYING OUT THE INVENTION

Referring to FIG. 1 a joint assembly 10 of the present invention is provided. The joint assembly 10 extends axially along an axis 11. The joint assembly 10 includes a first structure such as a first pair of spaced apart track links 12 and a second structure such as a second pair of spaced apart track links 14. A sleeve such as a track bushing 16 is positioned within the first structure 12. A pin 18 is positioned within the second structure 12 and the track bushing 16. An insert 20 is positioned between the track bushing 16 and the pin 18. A thrust ring 19 is positioned between the insert 20 and the second structure 14.

The first and second structures 12,14 are shown as pairs of spaced track links, however the present invention can be used in any structures having rotational movement therebetween. The first structure 12 includes a first track link 22 and a second track link 24. The first track link 22 includes a bore 26 and the second track link 24 includes a bore 28. The bores 26,28 being aligned along the axis 11. The second structure 14 includes a first track link 29 and a second track link 30. The first track link 29 includes a bore 31 and the second track link 30 includes a bore 32. The bores 31, 32 being aligned with the bores 26,28 of the first structure along the axis 11.

The track bushing 16 is positioned in the bores 26,28 and axially extends between the first and second track links 22,24. The track bushing 16 includes a first end portion 33, a second end portion 34, an intermediate portion 35 and a stepped bore 36 axially extending therethrough. The stepped bore 36 in the first and second end portions has a first predetermined inner diameter 38 and the bore 36 in the intermediate portion has a second predetermined inner diameter 40. The second predetermined inner diameter 40 being smaller in magnitude than the first predetermined diameter 38. A wall 42 extends between the first diameter 38 and the second diameter 40.

The pin 18 is positioned within the track bushing 16 and includes end portions 44,46 axially extending past the track bushing 16 and an outer predetermined outer diameter 48. The end portions 44,46 extent past the first structure 12 and extend into the bores 31,32 of the of the second structure 14. The pin 18 is maintained in the bores 31,32 of the second structure 14 by an interference fit to prevent axial movement of the structures relative to each other.

The insert 20 is free floating positioned around the pin 18 and within the first diameter 38 of the bore 36 in the end portions 30,32 of the bushing 16. The insert 20 includes a predetermined inner diameter 50 which is smaller in magnitude than the first and second diameters 38,40 of the track bushing 16 and larger in magnitude than the outer diameter 48 of the pin 18. The insert 20 includes an outer surface diameter 52, a first side surface 54 and a second side surface 56. The outer surface diameter 52 having a crown shape 58 to reduce edge loading. Sliding rotation occurs between the outer surface of the insert 20 and the bushing 16, the side surface 56 of the insert 20 and the wall 42, the inner diameter 50 of the insert and 20 and the pin 18, the side surface 54 and the thrust ring 19.

Referring to FIG. 2 an alternated joint assembly 60 is disclosed. A sleeve 62 is positioned in the first structure 12 and the sleeve includes a bore 66. An stepped pin 68 is positioned in the second structure 14 and extends into the bore 66 of the sleeve 62. The pin 68 includes a wall 72. The insert 20 is positioned around the pin 68 and slideably interacts with the wall 72. The thrust ring 19 is positioned around the pin 68 and slideably contacts the insert 20. The sleeve 62 has a straight bore 66 and the pin 68 is stepped.

INDUSTRIAL APPLICABILITY

In the use of the present invention a joint assembly 10 is provided. The joint includes the first spaced structure 12 connected together by the bushing 16 and the second spaced structure 14 connected together by the pin 18. The connection between the pin 18 and the second structure 14 is an interference fit to prevent lateral movement between the relative structures. The crowned insert 20 is positioned between the bushing 16 and the pin 18 to prevent galling and wear between the components as the components rotate around the axis 11. The insert 20 is free floating. If the structure receives unequal loading the pin and or bushing could deflect. The crowned insert will direct load forces to the center of the insert. Edge loading is reduced and deflection of the pin will be followed by the insert. As the structures rotate sliding rotation can occur between the wall 42 of the bushing 16 and the side surface 56 of the insert, the side surface 54 of the insert and the thrust ring 19, the insert and the pin and between the crowned surface of the insert 20 and the bushing 16.

In view of the forgoing, it is readily apparent that the structure of the present invention reduces wear and galling between the various structures.

Other aspects and advantages of this invention can be obtained from a study of the drawings, the disclosure and the appended claims.

What is claimed is:

1. A joint assembly adapted to connect a first structure to a second structure, the joint assembly comprising:
   a sleeve positioned within the first structure, the sleeve having a first end portion, a second end portion, an intermediate portion and a bore extending therethrough;
   an insert being positioned within the bore of the end portion of the sleeve, the insert having an inner diameter and an outer diameter; and
   a pin positioned within the second structure and being disposed within the intermediate portion of the sleeve and the insert.

2. The joint assembly of claim 1, wherein the first structure includes first and second members spaced apart, the second structure includes first and second members spaced apart, and the first and the second structures move relative one to the other.

3. The joint assembly of claim 1, wherein the bore in the sleeve is a stepped bore being larger in magnitude at the first and second end portions.

4. The joint assembly of claim 1, wherein the pin is stepped and includes a wall which slideably interacts the insert.

5. A joint assembly adapted to connect a first structure to a second structure, the joint assembly comprising:
   a sleeve positioned in the first structure, the sleeve having a first end portion, a second end portion, an intermediate portion and a stepped bore extending therethrough, the bore in the first and second end portions having a first predetermined inner diameter and the bore in the intermediate portion having a second predetermined inner diameter being smaller in magnitude than the first predetermined diameter of the first and second end portions;
   an insert positioned within the bore of the end portion of the sleeve, the insert having a predetermined inner diameter smaller in magnitude than the first and second predetermined inner diameters of the sleeve, the insert having an outer diameter, a first side surface, a second side surface and being positioned within the bore of the end portion of the sleeve; and
   a pin disposed within the intermediate portion of the sleeve and the insert, the pin being positioned within the second structure.

6. The joint assembly of claim 5, wherein the outer diameter of the insert includes a crown shaped surface to reduce edge loading of the pin and the sleeve.

7. The joint assembly of claim 5, wherein the insert is free floating between the pin and the sleeve.

8. The joint assembly of claim 7, includes a wall extending between the first diameter and the second diameter of the sleeve.

9. The joint assembly of claim 8, wherein sliding rotation occurs between the outer surface of the insert and inner surface of the end potion of the sleeve.

10. The joint assembly of claim 9, wherein sliding rotation occurs between the side surface of the insert and the wall of the sleeve.

11. The joint assembly of claim 10, wherein sliding rotation occurs between the inner diameter of the insert and the pin.

12. A track joint assembly adapted to connect a track chain together, the track chain having a first pair of spaced track links and a second pair of spaced track links, the track joint comprising:
   a track bushing extending between the first pair of spaced links, the track bushing having a first end portion, a second end portion, an intermediate portion and a stepped bore extending axially therethrough;
   a track pin extending between the second pair of spaced links, and
   an insert around the track pin being positioned between the track pin and the track bushing.

13. The track joint assembly of claim 12, wherein the track bushing bore includes a first predetermined inner diameter in the end portions of the track bushing and a second predetermined diameter in the intermediate portion of the track bushing, the second predetermined diameter being smaller in magnitude than the first predetermined diameter.

14. The track joint assembly of claim 13, wherein the insert includes a predetermined inner diameter smaller in magnitude than the first and second predetermined inner diameters of the track bushing, the insert having an outer diameter, a first side surface, a second side surface and being positioned within the bore of the first and second end portions of the track bushing.

15. The track joint assembly of claim 14, wherein the outer diameter of the insert includes a crown shaped surface to reduce edge loading of the pin and the track bushing.

16. The track joint assembly of claim 15, wherein the insert is free floating between the pin and the track bushing.

17. The track joint assembly of claim 16, includes a wall extending between the first diameter and the second diameter of the track bushing.

18. The track joint assembly of claim 17, wherein sliding rotation occurs between the crowned surface of the insert and the inner surface of the end portion of the track bushing.

19. The track joint assembly of claim 18, wherein sliding rotation occurs between the side surface of the insert and the wall of the track bushing.

20. The track joint assembly of claim 12, wherein the pin is stepped and includes a wall which slideably interacts with the insert.

* * * * *